UNITED STATES PATENT OFFICE.

GEORGE R. PERCY, OF NEW YORK, N. Y.

IMPROVED COMPOUND OF CONDENSED MILK AND UNCRYSTALLIZABLE SUGAR.

Specification forming part of Letters Patent No. 46,022, dated January 24, 1865.

*To all whom it may concern:*

Be it known that I, GEORGE R. PERCY, of the city, county, and State of New York, have invented a new and useful Commodity or Composition of Matter; and I do hereby declare the following to be a full and complete description of the process employed in the preparation of such product, so as to enable any person skilled in the art or science to which it most nearly appertains to make and use such composition without further invention or experiment.

My invention consists in the combination of uncrystallizable grape-sugar with condensed milk, forming a commodity or composition of matter never before known or used.

To enable others skilled in the art to make and use my invention, I will proceed to describe the process of making such commodity.

The milk may be drawn into a vacuum condensing-pan and condensed in any of the well-known ways to about the consistency of thick molasses. When the milk has attained this consistency, or at any such previous time as the operator may deem most expedient, a quantity of uncrystallizable grape-sugar reduced to about 32° Baumé is drawn into the vacuum-pan and commingled with the milk in the proportions varying from one-half pint to one quart of such uncrystallizable grape-sugar to every gallon of condensed milk, according to the time such milk is expected to be kept. This product is condensed to a standard consistence, and is then ready to be taken from the condensing-pan and put into vessels ready for sale.

The mode of making uncrystallizable grape-sugar is as follows: Grape-sugar or glucose is dissolved in a quantity of water and boiled from four to ten hours, care being taken to replenish the water which evaporates away; or it may be made by other well-known chemical means. For my use it is reduced to about 32° Baumé. A description of the manufacture of grape-sugar or glucose may be found in the second volume of Musprat's Chemistry, on pages 962 and 963.

One of the great advantages claimed in the use of uncrystallizable grape-sugar is that it may be manufactured from the whey of milk, and thus, by preserving the milk, only add to it a product made from the milk itself. Millions of gallons of whey are now wasted annually which might be easily converted into sugar if there were a demand for it. By thus creating a demand an immense waste is saved to cheese-makers, as well as enabling me to supply consumers with a better and cheaper article of milk. The great objections against the condensed milk which is prepared for preservation by the addition of cane-sugar are that it renders it extremely costly, and that such a quantity has to be added that it cloys the taste, and is to invalids and many other persons very unpleasant and unpalatable, and can only be used for cooking purposes or in adding to beverages. My process obviates this in a very great measure, as the product may be made at a much lower cost, as it has greater preservative powers, as it is not so sweet as that made from cane-sugar, and as it is more easily converted into food in the stomach than the other.

Having thus described my process for producing the commodity desired, what I claim as new, and desire to secure Letters Patent, is—

The commingling of a quantity of uncrystallizable grape-sugar with condensed milk in the manner substantially as above described.

In testimony whereof I have hereunto subscribed my name the 4th day of January, 1865.

GEORGE R. PERCY.

Witnesses:
SAML. R. PERCY,
GILBERT PERCY.